United States Patent
Weimer et al.

(10) Patent No.: US 8,673,035 B2
(45) Date of Patent: Mar. 18, 2014

(54) SOLAR-THERMAL REACTION PROCESSING

(75) Inventors: Alan W Weimer, Niwot, CO (US); Jaimee K Dahl, Superior, CO (US); Allan A Lewandowski, Evergreen, CO (US); Carl Bingham, Lakewood, CO (US); Karen J Raska Buechler, Westminster, CO (US); Willy Grothe, Boulder, CO (US)

(73) Assignees: The Regents of the University of Colorado, a body corporate, Denver, CO (US); Alliance for Substainable Energy, LLC, Golden, CO (US)

( * ) Notice: Subject to any disclaimer, the term of this patent is extended or adjusted under 35 U.S.C. 154(b) by 69 days.

(21) Appl. No.: 13/088,185

(22) Filed: Apr. 15, 2011

(65) Prior Publication Data

US 2011/0193026 A1    Aug. 11, 2011

Related U.S. Application Data

(63) Continuation of application No. 10/383,875, filed on Mar. 7, 2003, now Pat. No. 7,033,570, and a continuation-in-part of application No. 11/282,116, filed on Nov. 17, 2005, now abandoned, which is a continuation-in-part of application No. 10/383,875, filed on Mar. 7, 2003, now Pat. No. 7,033,570, which is a continuation-in-part of application No. 10/239,706, filed as application No. PCT/US01/15160 on May 8, 2001, now Pat. No. 6,872,378.

(60) Provisional application No. 60/362,563, filed on Mar. 7, 2002, provisional application No. 60/628,641, filed on Nov. 17, 2004, provisional application No. 60/203,186, filed on May 8, 2000.

(51) Int. Cl.
*B01J 7/00* (2006.01)
*C10J 3/00* (2006.01)
*C01B 3/24* (2006.01)

(52) U.S. Cl.
USPC ........... 48/61; 48/197 R; 423/644; 423/648.1; 423/650; 126/569

(58) Field of Classification Search
USPC ............ 48/61, 197 R; 126/569; 423/644, 650
See application file for complete search history.

(56) References Cited

U.S. PATENT DOCUMENTS 4,290,779 A * 9/1981 Frosch et al. ................. 422/186
4,357,305 A * 11/1982 Loo .............................. 422/241

* cited by examiner

*Primary Examiner* — Matthew Merkling
(74) *Attorney, Agent, or Firm* — Snell & Wilmer L.L.P.

(57) ABSTRACT

In an embodiment, a method of conducting a high temperature chemical reaction that produces hydrogen or synthesis gas is described. The high temperature chemical reaction is conducted in a reactor having at least two reactor shells, including an inner shell and an outer shell. Heat absorbing particles are included in a gas stream flowing in the inner shell. The reactor is heated at least in part by a source of concentrated sunlight. The inner shell is heated by the concentrated sunlight. The inner shell re-radiates from the inner wall and heats the heat absorbing particles in the gas stream flowing through the inner shell, and heat transfers from the heat absorbing particles to the first gas stream, thereby heating the reactants in the gas stream to a sufficiently high temperature so that the first gas stream undergoes the desired reaction(s), thereby producing hydrogen or synthesis gas in the gas stream.

20 Claims, 4 Drawing Sheets

SOLAR-THERMAL REACTION PROCESSING

RELATED APPLICATIONS

This application is a continuation of U.S. application Ser. No. 10/383,875, filed Mar. 7, 2003 and now U.S. Pat. No. 7,033,570, which claims the benefit of U.S. Provisional Application No. 60/362,563, filed Mar. 7, 2002, is a continuation-in-part of U.S. application Ser. No. 11/282,116, filed Nov. 17, 2005, which claims the benefit of and incorporates in by reference U.S. application Ser. No. 10/383,875, filed Mar. 7, 2003 and now U.S. Pat. No. 7,033,570, and that claims the benefit of U.S. Provisional Application No. 60/628,641, filed Nov. 17, 2004, and is a continuation-in-part of U.S. application Ser. No. 10/239,706, filed Feb. 24, 2003 now U.S. Pat. No. 6,872,378, which is the national stage of PCT Application Number PCT/US01/15160, filed May 8, 2001, which claims the benefit of U.S. Provisional Application No. 60/203,186, filed May 8, 2000, all of which are hereby incorporated by reference to the extent not inconsistent with the disclosure herein.

ACKNOWLEDGEMENT OF GOVERNMENT SUPPORT

This invention was made, at least in part, with funding from the United States Department of Energy under grant numbers DE-FC36-99GO10454 and DE-AC36-99GO10337. The United States Government has certain rights in this invention.

FIELD

In general, the disclosure relates to solar-thermal reactors and processes for carrying out high temperature chemical reactions. More particularly in an embodiment, it relates to a rapid-heating, short residence time solar-thermal process for carrying out highly endothermic dissociation reactions to produce hydrogen or hydrogen containing gases. Most particularly, in an embodiment it relates to those dissociation reactions wherein a solid particulate material is produced by the dissociation of a gaseous precursor.

BACKGROUND

There is a significant interest to develop benign processes for producing hydrogen that can be used as a fuel to power fuel cell vehicles. Such processes should reduce the amount of greenhouse gases produced, thus, minimizing impact on the environment. However, current methods for producing hydrogen incur a large environmental liability, because fossil fuels are burned to supply the energy to reform natural gas (primarily methane, $CH_4$) to produce hydrogen ($H_2$).

High temperatures above approximately 1500 K are required for producing hydrogen and carbon black at high rates by the direct thermal dissociation of methane [$CH_4$+heat-->$C+2H_2$] (reaction 1), ethane [$C_2H_6$+heat→$2C+3H_2$] (reaction 2), propane [$C_3H_8$+heat-->$3C+4H_2$] (reaction 3), or, in general, a mixture of gases such as natural gas generically represented as $C_xH_y$ [$C_xH_y$+heat-->$xC+(y/2)H_2$] (reaction 4).

Hydrogen can also be produced by the dry reforming of methane with carbon dioxide [$CH_4+CO_2$-->$2CO+2H_2$]. It is also possible to carry out dissociation of methane simultaneously with the dry reforming of methane if excess methane is present relative to that required to react carbon dioxide. Such processes are useful since they can provide for a high hydrogen content synthesis gas by utilizing natural gas from natural gas wells that contain a high concentration of carbon dioxide (typically 10 to 20 volume % $CO_2$) or using landfill biogas (30 to 40 volume % $CO_2$).

Hydrogen can also be produced by the thermal dissociation of hydrogen sulfide [$H_2S$+heat-->$H_2+S$] (reaction 5).

For these types of dissociation reactions, a solid (either C or S) is formed as a co-product (with $H_2$) of the reaction. Often, the solid that is formed is in the state of fine particles. These particles have a tendency to deposit along the walls of reaction vessels or cooling chambers where the dissociation is occurring. If deposition occurs along the inside walls of the heated reactor, the particles tend to aggregate and crystallize. For the case of carbon deposition, the normally amorphous ultra-fine particles will grow in size and graphitize. Large graphitic carbon particles are less reactive compared to more amorphous fine sized particles and, hence, are of lower value. Furthermore, deposition on the reactor walls can cause plugging of the reactor and eventual shutdown of the process, thus, preventing continuous operation. In addition, carbon deposition on an outer transparent wall of a solar reactor can lead to overheating of the reactor wall.

U.S. Pat. No. 4,552,741, to Buck et al., reports carbon dioxide reforming of methane in a system comprising two catalytic reactors. One of the catalytic reactors is heatable with solar energy. In the abstract, the reactors are stated to be "filled with a catalyst".

U.S. Pat. No. 5,647,877 reports solar energy gasification of solid carbonaceous material in a liquid dispersion. The solid carbonaceous material is heated by solar energy and transfers heat to a surrounding liquid. Hydrogen is produced in the process by the decomposition/gasification of the hydrocarbon (coal) particles.

EP 0675075A reports the use of solar energy to generate hydrogen from water. In the reported process, water is reduced to hydrogen with a metal, followed by reduction of the metal oxide with a reducing agent.

Hence, there is a need to develop high temperature environmentally benign processes for the production of $H_2$ by thermal dissociation of hydrocarbon gases, such as natural gas, and to prevent the deposition of the products of dissociation on reactor walls.

SUMMARY

Various methods and apparatus are described for a high temperature chemical reactor. In an embodiment, a high temperature chemical reactor conducts a reaction process to that produces hydrogen or synthesis gas. The reactor may have at least two reactor shells, including an inner shell and an outer shell. The inner shell has an inlet and an outlet and the outer shell is nonporous and substantially encloses the second inner shell. A particle inlet provides heat absorbing particles in a first gas stream flowing in the inner shell. The reactor is heated at least in part by a source of concentrated sunlight. The inner shell is heated by the concentrated sunlight, and the inner shell re-radiates from the inner wall and heats the heat absorbing particles in the first gas stream flowing through the inner shell, and heat transfers from the heat absorbing particles to the first gas stream. The heat absorbing particles heats the reactants in the first gas stream to a sufficiently high temperature so that the first gas stream undergoes the desired reaction(s), thereby producing hydrogen or synthesis gas in the first gas stream.

BRIEF DESCRIPTION OF THE DRAWINGS

The multiple drawings refer to the embodiments of the invention.

Figure 1:
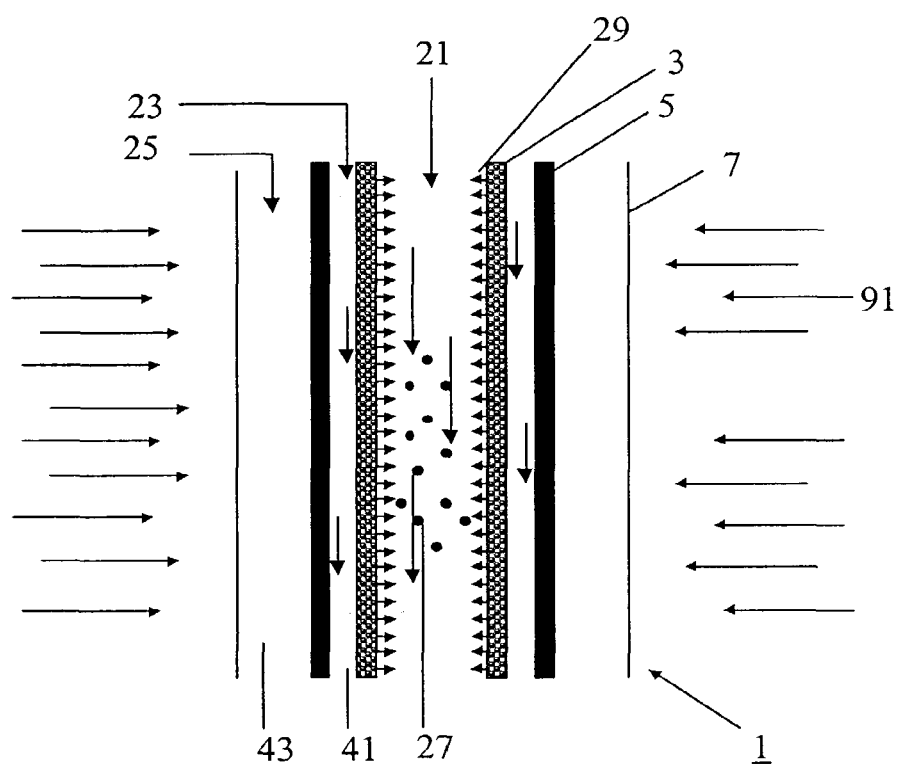
FIG. 1 is a cross-sectional view of the central portion of a solar-thermally heated fluid-wall reactor having three walls. The innermost wall of the reactor is a porous "reactor" wall, the next outermost wall of the reactor is a solid "heating" wall, and the outermost wall of the reactor is a transparent "protection wall".

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In an embodiment, a high temperature chemical reactor conducts a reaction process to that produces hydrogen or synthesis gas. The reactor may have at least two reactor shells, including an inner shell and an outer shell. The inner shell has an inlet and an outlet and the outer shell is nonporous and substantially encloses the second inner shell. A particle inlet provides heat absorbing particles in a first gas stream flowing in the inner shell. The reactor is heated at least in part by a source of concentrated sunlight. The inner shell is heated by the concentrated sunlight, and the inner shell re-radiates from the inner wall and heats the heat absorbing particles in the first gas stream flowing through the inner shell, and heat transfers from the heat absorbing particles to the first gas stream. The heat absorbing particles heats the reactants in the first gas stream to a sufficiently high temperature so that the first gas stream undergoes the desired reaction(s), thereby producing hydrogen or synthesis gas in the first gas stream. A solar concentrator designed to optimize an amount of solar thermal heating for the reaction process by using concentrated sunlight to transfer heat at extremely high rates by radiation heat transfer from the inner shell. The length of the inner shell and amount of flux provided by the solar concentrator are designed to carry out high temperature thermal dissociation reactions requiring rapid-heating and short residence times using solar energy The disclosure provides a method for carrying out high temperature thermal dissociation reactions requiring rapid-heating and short residence times using solar energy. In particular, the method of the disclosure allows production of hydrogen and hydrogen containing gases through thermal dissociation of a gas comprising hydrocarbon gases or mixtures thereof (such as natural gas) and/or hydrogen sulfide. The methods of the disclosure also allow production of hydrogen through dry reforming of methane with carbon dioxide. The disclosure also provides high temperature solar reactors.

In particular, the disclosure provides a high temperature solar-thermal reactor comprising a. a first inner shell which is at least partially porous, the first inner shell having an inlet and an outlet;

b. a second inner shell which is nonporous and which substantially encloses the first inner shell;

c. a first gas plenum located substantially between the first and second inner shell, the first plenum having an inlet and an outlet, wherein the first plenum outlet is formed by the pores of the first inner shell;

d. an outer shell which is nonporous, at least partially transparent, and which substantially encloses the second inner shell; and e. a second gas plenum located substantially between the second inner shell and the outer shell, the second plenum having an inlet and an outlet, wherein the reactor is heated at least in part by a source of concentrated sunlight and the first inner shell is prevented from fluid communication with the first and second gas plenums inside the reactor, except for fluid communication between the first inner shell and the first gas plenum through the pores of the first inner shell.

FIG. 1 is a cross-section of the central portion of a reactor in the present disclosure. In the figures, the same numbers are used to identify like features. In the configuration shown in FIG. 1, the reactor (1) has a first, innermost, inner shell (3) which is at least partially porous, a second inner shell (5) which is non-porous, and an outer shell (7) which is at least partially transparent to solar radiation and is also non-porous. As used herein, "shells" encompass tubes, pipes or chambers which are elongated along a longitudinal axis. As used herein, a "porous" shell region permits gas flow through the walls of the region while a "nonporous" shell region does not. In a reactor with three shell, the first inner shell is substantially enclosed by the second inner shell and the outer shell and the second inner shell is substantially enclosed by the outer shell. As used herein, "substantially encloses" means that one shell is enclosed by another for most of the length of the shell. The ends of a shell that is substantially enclosed by another may extend past the ends of the other shell (e.g. the ends of the first inner shell may extend past the ends of the second inner shell and/or the outer shell). FIG. 1 illustrates an embodiment where the "shells" are concentric tubes of circular cross-section.

FIG. 1 also illustrates the central portion of the first (41) and second (43) gas plenums. During operation of the reactor, gases are flowed through the first inner shell and the two gas plenums by connecting each of the respective inlets to at least one gas source. The porous region(s) of the first inner shell serve as an outlet to the first gas plenum. FIG. 1 illustrates three gas streams, a first gas stream (21) flowing through the first inner shell, a second gas stream (23) flowing through the first plenum, and a third gas stream (25) flowing through the second plenum. Preferably, the first gas stream is prevented from mixing with the third gas stream within the reactor and mixing between the first and second streams is limited to mixing within the first inner shell due to flow of gas from the second gas stream through the porous region(s) of the first inner shell. In other words, the first inner shell is preferably prevented from fluid communication with the first and second plenum inside the reactor, except for fluid communication between the first inner shell and the first plenum through the porous region(s) of the first inner shell. In addition, during operation of the reactor fluid communication between the first inner shell and the first plenum is primarily in the direction from the first plenum to the first inner shell. The pressure within the first plenum is high enough to overcome the resistance of the porous first inner shell and still have a pressure (at the instant the gas from the second gas stream leaves the pore) greater than the pressure inside the shell. Restricting fluid communication between the first inner shell and the first and second plenum can prevent deposition of particulate reaction products on the other shells and reduce the amount of gas from the second and third gas streams which enters the first inner shell. The overall volumetric flow rate of gases through the first inner shell can affect the residence time and the production throughput of the reactor. If the second and third gas streams are different, it is also preferred to prevent mixing of the second and third gas streams within the reactor.

Figure 2:
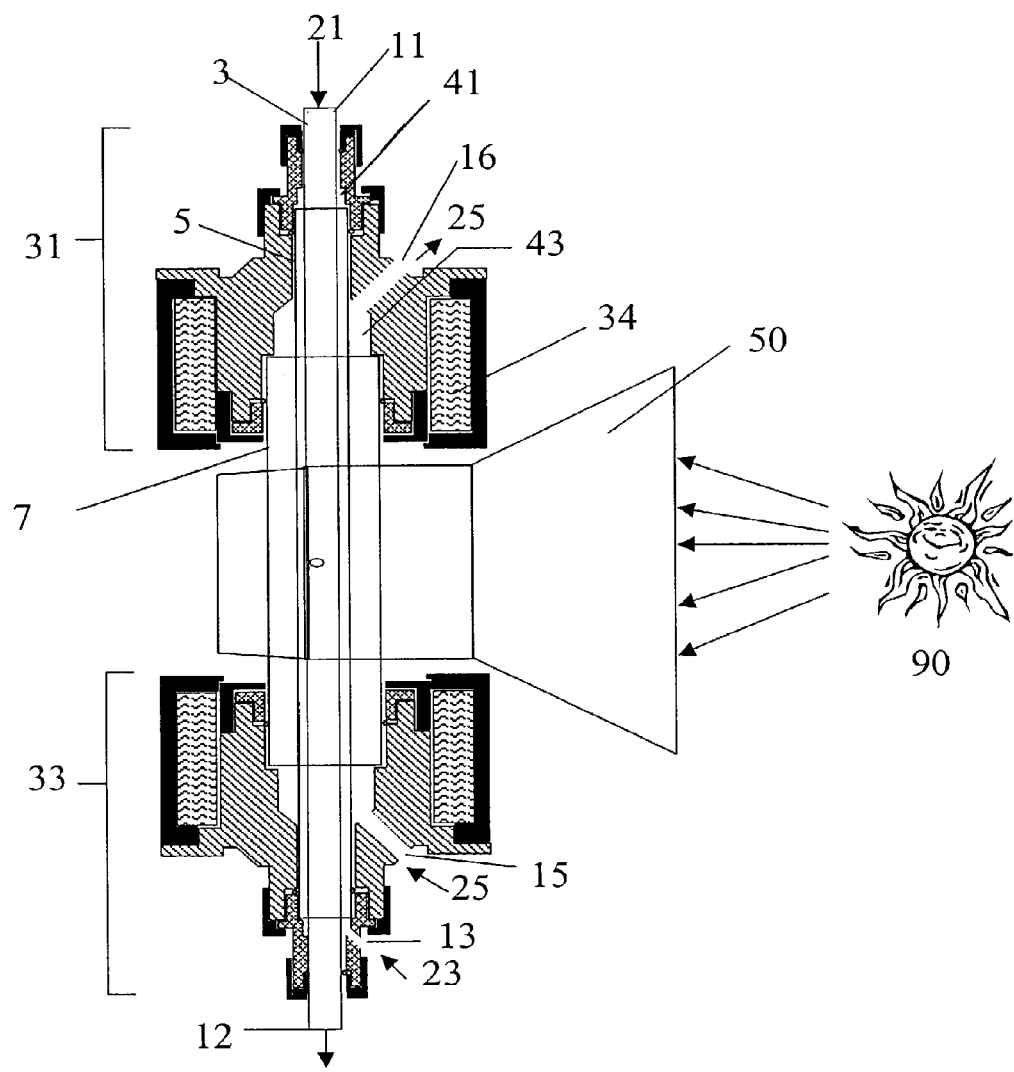
FIG. 2 is an overall cross-section of another reactor of the disclosure.

In one embodiment, mixing of the gas streams is restricted by seals. If the inner and outer shells are tubes as shown in FIG. 1, the plenums are further defined by these seals, since they serve to define the gas volume. Statement that a plenum is located "substantially between" two shells encompasses an extension of the plenum beyond the two shells into a sealing structure. In addition, a plenum being "substantially located" between two shells encompasses reactor configurations where other reactor elements, for example thermal insulation, are also located between the two shells. FIG. 2 illustrates one sealing configuration which can be used to prevent mixing of the gas streams within the reactor. In FIG. 2, the inlet and outlets for the inner and outer shells are illustrated as part of the sealing structures (31) and (33). The inner shell inlet (11) and outlet (12) are substantially sealed from the first plenum (41) and second plenum (43). FIG. 2 also shows the first plenum inlet (13), with the outlet of the first plenum being the porous region of the inner shell, and second plenum inlet (15) and outlet (16). The sealing structures shown in FIG. 2 are cooled with water (34) to prevent heat damage to the fitting and sealing materials. Other suitable seal configurations are known to those skilled in the art. Furthermore, the seal configuration may be different at the inlet and outlet ends of the reactor.

The reactor shown in FIG. 1 is operated generally as follows. Concentrated solar-thermal radiation (91) passes through the outer "protection" shell (7) and directly heats the second inner "heating" shell (5). The nonporous heating shell re-radiates from its inner wall and heats the first inner "reaction" shell (3). Hence, the inner "reaction" shell (3) is heated indirectly by concentrated sunlight from the surrounding "heating" shell (5). The inner "reaction" shell (3) re-radiates from the inner wall and heats the radiation absorber particles (27) and first gas stream (21) flowing through it. When heated, the first gas stream undergoes the desired reaction(s). As the first gas stream is heated and the desired reaction(s) occur, one or more product gases are added to the gas stream. A second gas stream (23) of non-oxidizing and non-dissociating "fluid-wall" gas flows in the annular region between the central "heating" shell and the inner "reaction" shell. The "fluid-wall" gas enters the first plenum between the inner and outer shell through an inlet and exits the plenum through an outlet. One outlet of the first plenum is the porous section of the inner shell. An additional outlet for the first plenum may be used, so long as sufficient gas flow is provided through the porous section of the inner shell. The "fluid-wall" gas flows through the pores of the porous section of the "reaction" shell (3), exits radially along the inside of the "reaction" shell and provides for an inner "fluid-wall" gas blanket (29) that prevents deposition of dissociation product particles on the inside wall of the "reaction" shell. After entering the first inner shell, the "fluid-wall" gas exits through the outlet of the first inner shell. A third gas stream (25) of non-oxidizing and non-dissociating "purge" gas flows in the annular region between the outer "protection" shell and the center "heating" shell, thus preventing oxidation of the central "heating" shell and any insulation that may be present between the "protection" and "heating" shell.

In another embodiment, the reactor comprises
a) an inner shell which is at least partially porous, the inner shell having an inlet and an outlet;
b) an outer shell which is nonporous, at least partially transparent, and which substantially encloses the second inner shell; and
c) a gas plenum located substantially between the inner and outer shell, the plenum having an inlet and an outlet,
wherein the reactor is heated at least in part by a source of concentrated sunlight and the only fluid communication between the inner shell and the gas plenum inside the reactor occurs through the pores of the inner shell.

This reactor is operated as follows. Concentrated solar-thermal radiation passes through the outer "protection" shell and directly heats the inner "reaction" shell. The inner "reaction" shell re-radiates from the inner wall and heats the radiation absorber particles and first gas stream flowing through it. When heated, the first gas stream undergoes the desired reaction(s). A second gas stream of non-oxidizing and non-dissociating "fluid-wall" gas flows in the annular region between the outer "protection" shell and the inner "reaction" shell. The "fluid-wall" gas enters the plenum between the inner and outer shell through an inlet and exits the plenum through an outlet. The porous section of the inner shell forms one outlet of the plenum. An additional outlet for the plenum may be used, so long as sufficient gas flow is provided through the porous section of the inner shell. The "fluid wall" gas flows through the pores of the porous section of the "reaction" shell, exits radially along the inside of the "reaction" shell and provides for an inner "fluid-wall" gas blanket that prevents deposition of dissociation product particles on the inside wall of the "reaction" shell.

In general, the shells comprising the reactors of the disclosure may be positioned vertically or horizontally, or in any other spatial orientation. For the case of a vertical reaction shell process, the apparatus may be arranged to provide upward or downward flow of the gas stream and the cloud of particles. Upward flow guarantees that aggregated particles will not be carried through the reaction shell. Downward flow reduces the potential for plugging in the solids feed line, if present. Preferably, the reactor shell is positioned vertically and flow is downward.

The disclosure provides a method for carrying out a high temperature chemical reaction process to produce hydrogen or synthesis gas comprising the steps of:
a) providing a reactor comprising at least two reactor shells, including an innermost and an outer shell, wherein the innermost shell is substantially enclosed by each of the other reactor shells, has an inlet and an outlet and is at least partially porous and the outer shell is nonporous and at least partially transparent;
b) flowing a first gas stream comprising at least one reactant gas from the inlet to the outlet of the innermost shell;
c) flowing a second gas stream comprising a non-dissociating gas inwardly through the pores of the first inner shell;
d) providing heat absorbing particles in the first gas stream;
e) heating the heat absorbing particles at least in part with a source of concentrated sunlight through indirect solar thermal heating; and
f) transferring heat from the particles to the first gas stream, thereby heating the reactant gas to a sufficiently high temperature so that a desired amount of conversion of the reactant gas occurs, thereby producing hydrogen or synthesis gas.

For a reactor having a first inner shell, a second inner shell, and an outer shell, the disclosure provides a method comprising the steps of:
a) providing a reactor comprising a first inner shell which is at least partially porous and has a first inner shell inlet and outlet, a second inner shell which is nonporous and substantially encloses the first inner shell, an outer shell which is nonporous, at least partially transparent and substantially encloses the second inner shell, a first plenum substantially located between the first inner shell and the second inner shell and having a first plenum inlet and outlet, and a second plenum substantially located between the second inner shell and the outer shell and having a second plenum inlet and outlet wherein the first plenum outlet is formed by the pores of the first inner shell and the first inner shell is prevented from fluid communication with the first and second gas plenums inside the reactor, except for fluid communication between the first inner shell and the first gas plenum through the pores of the first inner shell;

b) flowing a first gas stream comprising at least one reactant gas from the inlet to the outlet of the first inner shell;

c) flowing a second gas stream comprising a non-dissociating gas through the inlet of the first plenum, thereby causing part of the second gas stream to flow inwardly through the pores of the first inner shell;

d) flowing a third gas stream comprising a non-dissociating, non-oxidizing gas from the inlet to the outlet of the second plenum;

d) providing heat absorbing particles in the first gas stream;

e) heating the heat absorbing particles at least in part with a source of concentrated sunlight through indirect solar thermal heating; and g) transferring heat from the particles to the first gas stream, thereby heating the reactant gas to a sufficiently high temperature so that a desired amount of conversion of the reactant gas occurs, thereby producing hydrogen or synthesis gas.

The innermost inner shell (the first inner shell in a three-shell reactor) has an inlet and an outlet for the first gas stream. The interior of the innermost shell defines a reaction chamber within which the high temperature reaction takes place. The innermost shell is capable of emitting sufficient radiant energy to raise the temperature of the reactant gas(es) within the reaction chamber to a level required to initiate and sustain the desired chemical reaction. The innermost shell is made of a high temperature refractory material. The refractory material subsequently heats flowing radiation absorber particles flowing through the first inner shell and is substantially chemically unreactive with the particles or the reactant or product gases. A preferred material for the innermost shell is graphite.

The innermost shell is at least partially porous. The innermost shell may be wholly of porous material or may comprise one or more regions of porous material. For example, the innermost shell may take the form of a graphite tube having a central porous region with nonporous ends. The porous region(s) of the innermost shell are selected so that sufficient uniform flow of non-dissociating gas occurs radially inward through the pores to provide a fluid-wall protective blanket for the radially inward surface of the innermost shell. The fluid-wall can prevent particle deposition on the radially inward surface of the innermost shell. The porosity of the porous region(s) can be varied and is selected on the basis of the required gas flow and allowable pressure drop to provide for a fluid-wall of gas to prevent deposition along the inside wall of the reactor. The length of the porous section(s) of the "reaction" shell can be varied and is determined by the zone where particle deposition is most likely to occur. Likewise, the placement of the porous section along the length of the "reaction" shell is determined by the most likely location of particle deposition. Preferably, the length of the porous section of the "reaction" shell is limited to where it is needed to prevent wall deposition of dissociation product particles. Too large of a porous section will provide for too much fluid-wall gas entering the interior of the innermost "reaction" shell. The entry of fluid-wall gas into the "reaction" shell increases the overall volumetric flow rate of gases through the "reaction" shell, thus reducing residence time and limiting the production throughput of the reactor.

A second inner shell substantially enclosing the first inner shell may be present, but is not required. If no second inner shell is present the "reaction" shell is heated directly by concentrated sunlight passing through the "protection" shell and "fluid wall" gas is flowed in the plenum substantially located between the "reaction" shell and the "protection" shell.

The use of a second inner shell offers several advantages. The use of a nonporous second inner shell distances the "fluid wall" gas from the outer "protection" shell, which can increase the safety of the process when the "fluid wall" gas is a flammable gas such as hydrogen. Furthermore, if the second inner shell is a tube made of a material such as graphite, an electrical current can be run from one end of the tube to the other and generate additional heat for the process through resistance heating of the tube. This additional heat can supplement the process at times when the source of concentrated sunlight does not provide the desired amount of energy (e.g. a cloudy day).

Typically, the second inner shell is composed of nonporous high temperature refractory material. The second inner shell is most preferably made of solid graphite. As previously discussed, the second inner shell can function as a "heating" shell, since it radiates heat to the innermost shell. In addition, the combination of the first and the second inner shell at least partially defines a first plenum or volume for the non-dissociating fluid wall gas.

Additional inner shells can be used in the process. If used, they are sized and positioned so that the innermost shell is enclosed by each of the other reactor shells (i.e. the reactor shells are substantially "nested" one inside the other). If additional inner shells are used, "purge" gas can be used to prevent oxidation of these shells as well.

The outer "protection" shell is at least in part transparent or semi-transparent to the concentrated sunlight, thereby allowing concentrated sunlight to flow through and heat the inner shell(s) of the reactor. The "protection" shell is made of a high temperature material that is oxidation resistant. A suitable material for the transparent portion of the outer shell is quartz. The transparent portion of the outer shell may be a transparent section, window or opening to allow the concentrated sunlight into the vessel. The shell wall transparent area, allowing for concentrated sunlight entry and subsequent solar thermal heating, should be selected to provide heating during the desired reaction residence time requirements for the process.

The outer shell may be made entirely of quartz. In this case, the sections of the internal wall of the outer shell where sunlight is not being concentrated and entering the vessel, may be coated with a reflective material, such as silver, to keep the concentrated sunlight inside the reactor. If such a reflective coating is used, there must be an uncoated transparent section, window or opening to allow the concentrated sunlight into the vessel.

Figure 3:
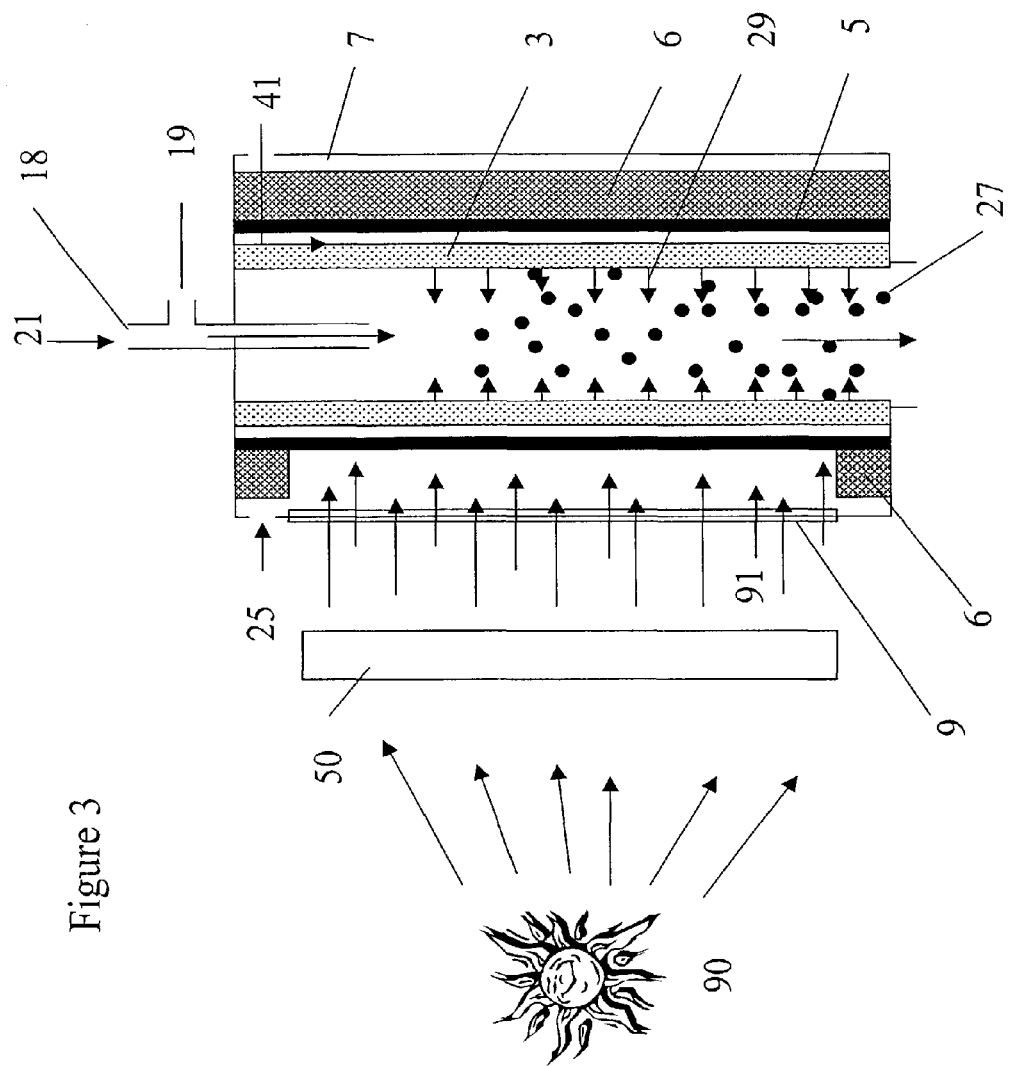
FIG. 3 is a cross-section of a reactor having a transparent window in the outer shell.

Alternatively, the outer "protection" shell may be made of a refractory non-transparent material with a section containing a transparent window where concentrated sunlight can enter, as schematically illustrated in FIG. 3. In the configuration shown in FIG. 3, both a first (3) and a second inner shell (5) are substantially enclosed by the outer shell. The "heating" shell (5) is directly exposed to concentrated sunlight in the section of the shell located in the path of the sun through the transparent section (9) of the "protection" shell (7). As shown in FIG. 3, the "heating" shell may be surrounded by refractory insulation (6) in the region where it is not directly exposed to concentrated sunlight via the transparent section. The insulation may be concentrically placed and extends substantially from the "heating" shell to the concentric "protection" shell, although it may not completely fill the space between the heating shell and the protection shell. The refractory insulation can be a combination of graphite insulation near the "heating" shell and an alumina type refractory insulation near the "protection" shell. This design arrangement allows concentrated sunlight to enter through a transparent section and heat the "heating" shell while the surrounding insulation reduces losses of ultraviolet radiation from the "heating" shell, thereby increasing the efficiency of the process. It is also possible to provide cooling of the outer metal refractory "protection" shell, particularly in the region immediately surrounding the transparent window allowing concentrated sunlight to directly heat the "heating" shell. The nontransparent refractory material may be a metal with a sufficiently high melting point, such as steel. In FIG. 3, the inlet (11) to the first inner shell is shown as having a feed gas inlet (18) and optional heat absorbing particle feed inlet (19). The particle feed inlet is not required if the heat absorbing particles are wholly generated by the dissociation process.

The combination of the outermost inner shell and the outer shell at least partially defines a plenum or volume for gas. If no second inner shell is used in the reactor, non-dissociating fluid wall gas flows in the space between the outer shell and the inner shell. Otherwise, a non-oxidizing and non-dissociating "purge" gas typically flows between a second plenum substantially located between the outer shell and the second inner shell to protect the second inner "heating" shell from oxidation.

The first gas stream initially comprises at least one reactant selected from $CH_4$, $C_2H_6$, $C_3H_8$, generally $C_xH_y$, $H_2S$, natural gas, or a combination thereof. The first gas stream may contain substantial amounts of carbon dioxide, as may be present in "biogases" such as landfill gas. Landfill gases may contain as much as 40% carbon dioxide. The first gas stream may also initially comprise a non-reactive gaseous component. For example, in lab-scale tests, methane is sometimes diluted with argon for safety reasons. As the gas stream is heated and the reaction or reactions occur, one or more product gases are added to the gas stream. These product gases comprise $H_2$ and, depending on the composition of the reactant gases, may also comprise incomplete dissociation products such as $C_2H_2$, $C_2H_4$, or other gases. In the case of reactions (1 to 4), additional carbon particles are also produced, and in the case of reaction (5), elemental sulfur is produced. A preferred reactant gas stream is natural gas or one containing natural gas. A most preferable reactant gas stream is natural gas which is free of mercaptans and hydrogen sulfide.

In the method of the disclosure, the first gas stream is heated to a sufficiently high temperature within the reactor that the desired amount of conversion of the reactant gas(es) is obtained. Hydrogen formation may take place below this temperature. Preferably the first gas stream is heated to at least about 1500 K within the reactor. As used herein, the use of "about" with reference to a temperature implies that the temperature is within 25 K of the stated temperature. In other embodiments, the reactant gas is heated to about 2100 K or heated to a maximum temperature in the range between about 1500 K and about 2700 K or between about 1800 K and about 2400 K. The temperature inside the innermost shell of the reactor can be measured with a thermocouple. Alternatively, temperatures inside the reactor can be measured with an optical pyrometer. For a three-shell reactor, the hot zone temperature measured with an optical pyrometer is typically the temperature of the nonporous "heating" shell, since the "heating" shell encloses the "reaction" shell in the hot zone. The temperature inside the inner "reaction" shell may be less than that of the "heating" shell due to thermal losses due to heating the porous shell and the gases in the first plenum and the reaction shell.

The reactors and methods of the disclosure allow conversion of at least about 30% of a hydrocarbon or hydrogen sulfide reactant gas. As used herein, the amount of conversion is the ratio of the moles of reactant gas reacted to the moles of reactant gas supplied. In various embodiments, the reactors and methods of the disclosure can produce at least 50% or at least 70% conversion of reactant gas.

As used herein, the "residence time" is the time that the reactant gas(es) spend in the hot zone of the innermost "reaction" shell The hot zone length may be estimated as the length of the reactor directly irradiated by the source of concentrated sunlight. The residence time depends on the flow rate of the first gas stream containing the reactant gas(es), the flow rate of the fluid wall gas through the pores of the inner shell, the reactant gas temperature and the degree of conversion of the reactant gas(es). The residence time may be calculated through modeling or estimated by averaging the residence times of the components of the gas stream flowing through the innermost tube at reaction temperature and assuming that half of the actual conversion occurs over the entire length of the hot zone and contributes to the formation of additional moles of gas (e.g., 2 moles of hydrogen are formed for every mole of methane converted). In the methods of the disclosure, the residence time is preferably between about 1 and about 50 milliseconds. More preferably, the residence time is between about 5 and about 30 ms. Most preferably, the residence time is between about 10 and about 20 ms.

In the methods of the disclosure, heat absorbing particles are provided in the first gas stream. The radiation absorbing particles are heated indirectly by solar-thermal heating, and they must be easily separated from the gas after processing. Typically, these radiation-absorbing particles are carbon black. As used herein, "indirect" heating means that the heating is by radiation from a heated wall that is itself heated indirectly or directly by solar-radiation. In one embodiment, the particles are fine carbon black particles. Carbon black is chemically stable at extremely high temperatures and can be easily separated from the flowing process gas using a filter and/or cyclone separator. Because carbon is produced according to hydrocarbon dissociation reactions, it is compatible with the hydrocarbon dissociation type of reactions to be carried out in the process for producing $H_2$. Preferably, the particles comprise recycled carbon black synthesized according to the dissociation reactions of the present disclosure. More preferably, the particles are carbon black particles generated in-situ from the dissociation of a reactant gas. In this manner, the carbon black particles can be produced in situ via dissociation reactions of gaseous hydrocarbons, thereby eliminating the need to feed the particles into the reactor. Sulfur particles produced from dissociation of hydrogen sulfide are also suitable for use as heat absorbing particles.

The radiation absorbing particles must be dispersed in the reactor apparatus, and the form of dispersion is important. The particles should flow as a dust or particle cloud through the apparatus, dispersed in a dispersing process gas. The radiation absorbing particles should have a fine primary particle size, preferably in the sub-micron size range, and be non-agglomerated, thus providing the highest surface area possible for solar radiation absorption. The heat absorbing particles may be provided as a result of the dissociation reaction. For example, carbon black particles can be produced in situ via dissociation reactions of gaseous hydrocarbons. The particles produced via reactions 1-5 using the methods of the disclosure typically have a primary particle size less than about 50 nm and are essentially amorphous. Carbon black particles produced using the methods of the disclosure are essentially ash-free and may be more amorphous than those produced using other commercially available carbon black producing processes. The particles may also be provided by feeding the particles into the reactor.

When the particles are provided by feeding preformed particles into the reactor, several different methods can be used to disperse the particles. The particles can be dispersed mechanically, such as by shearing on the surface of a rotating drum or brush. Alternatively, the particles can be dispersed using the shear provided by high velocity gas exiting with the particles from a feed injection tube. Experience has shown that the exiting "tip speed" from the injection tube should be at least 10 m/s to provide the shear necessary for complete dispersion of fine powders. Particles generated in-situ are inherently well dispersed in the process.

The process gas used for dispersing the particles must be compatible with the reaction process or easily separated after processing. It may be a mixture of recycle gases from the process. Preferred dispersing process gases comprise natural gas, CxHy, CH4, or H2, or a combination thereof.

In general, the radiation absorbing particles flow co-currently with the flowing gas stream through a reaction shell to maximize heat transfer from the particles to the gas. The shell may be oriented horizontally or vertically. For the case of a vertical reaction shell process, the flow direction may be upward or downward. Upward flow guarantees that aggregated particles will not be carried through the reaction shell, and downward flow reduces the potential for plugging in the solids feed line. A preferred flow direction is downward with particles generated internally and separated downstream.

The second gas stream used to provide the "fluid-wall" blanket gas flowing inward from the porous "reaction" shell wall is preferably a non-dissociating gas so as not to plug the pores of the porous wall. The fluid-wall gas is also selected to be compatible with the reactants and the products, i.e., so that it will not interfere with the reaction or be difficult to separate from the gas stream exiting the reaction shell. The fluid wall gas is preferentially a product of the reaction being carried out. Hydrogen (H2) is a preferred fluid wall gas when carrying out reactions (1) through (5). The H2 may be recycled from a downstream purification process. Inert gases, such as N2 or argon are also suitable for use as the second gas stream.

In reactors having a first and second inner shell and an outer shell, a third gas stream comprising a non-oxidizing and non-dissociating "purge" gas flows between the outermost "transparent or semi-transparent protection" shell and the solid "heating" shell. This "purge" gas can be an hydrogen or an inert gas such as N2 or argon.

In the methods of the disclosure, heat absorbing particles are heated at least in part with a source of concentrated sunlight (91). The reactors may be heated by solar energy alone or by a combination of solar energy and resistance heating of one of the shells of the reactor. The source of concentrated sunlight (91) may be a solar concentrator (50), as shown in FIGS. 2 and 3. These two figures also show unconcentrated sunlight (90) entering the solar concentrator. Preferably, the solar concentrator of the apparatus is designed to optimize the amount of solar thermal heating for the process. Solar fluxes between about 1500 and about 2000 kW/m2 have been shown to be sufficient to heat the particles to temperatures between 1675 and 1875 K. More preferably, solar fluxes between about 2000 and 5000 kW/m2 are desired to achieve even higher temperatures and reactor throughputs. Most preferably, reaction temperatures are approximately 2100 K.

The sunlight can be provided in the form of a collimated beam (spot) source, a concentric annular source distributed circumferentially around the reactor, or in the form of a linearized slot source providing heating axially along the length of reactor. The light can be redirected and focused or defocused with various optical components to provide the concentration on or in the reactor as required. An example of a suitable solar concentrator for use in the present disclosure is the High-Flux Solar Furnace (HFSF) at the National Renewable Energy Laboratory (NREL) in Golden, Colo. The HFSF uses a series of mirrors that concentrate sunlight to an intensified focused beam at power levels of 10 kW into an approximate diameter of 10 cm. The HFSF is described in Lewandowski, Bingham, O'Gallagher, Winston and Sagie, "Performance characterization of the SERI Hi-Flux Solar Furnace," Solar Energy Materials 24 (1991), 550 563. The furnace design is described starting at page 551, wherein it is stated, The performance objectives set for the HFSF resulted in a unique design. To enable support of varied research objectives, designers made the HFSF capable of achieving extremely high flux concentrations in a two-stage configuration and of generating a wide range of flux concentrations. A stationary focal point was mandatory because of the nature of many anticipated experiments. It was also desirable to move the focal point off axis. An off-axis system would allow for considerable flexibility in size and bulk of experiments and would eliminate blockage and consequent reduction in power. In particular, achieving high flux concentration in a two-stage configuration (an imaging primary in conjunction with a nonimaging secondary concentrator) dictates a longer f/D [ratio of focal length to diameter] for the primary [concentrator] than for typical single-stage furnaces. Typical dish concentrators used in almost all existing solar furnaces are about f/D=0.6. To effectively achieve high flux concentration, a two-stage system must have an f/D=2. Values higher than this will not achieve significantly higher concentration due to increased losses in the secondary concentrator. Values lower than this will result in a reduction of maximum achievable two-stage flux. At low values of f/D, the single stage peak flux can be quite high, but the flux profiles are also very peaked and the average flux is relatively low. With a longer f/D, two-stage system, the average flux can be considerably higher than in any single-stage system. The final design of the HFSF has an effective f/D of 1.85. At this f/D, it was also possible to move the focal point considerably off axis (about 30 degrees) with very little degradation in system performance. This was because of the longer f/D and partly because of the multi-faceted design of the primary concentrator. This off-axis angle allows the focal point and a large area around it to be completely removed from the beam between the heliostat and the primary concentrator.

When the outer shell is wholly transparent or has a window which extends completely around the shell, the concentrated sunlight is preferably distributed circumferentially around the reactor using at least one secondary concentrator. Depending upon the length of the reaction shell, multiple secondary concentrators may be stacked along the entire length of the reaction shell. For the HFSF described above, a secondary concentrator that is capable of delivering 7.4 kW of the 10 kW available (74% efficiency) circumferentially around a 2.54 cm diameter times 9.4 cm long reaction tube has been designed, constructed, and interfaced to the reactor.

The disclosure also provides reactor systems which combine the reactor of the disclosure with one or more other system elements. System elements useful for use in the present disclosure include, but are not limited to, particle dispersion and feeding devices, sources of concentrated solar energy, cooling zones, filtering devices, various purification devices, hydrogen storage devices, and thermophotovoltaic devices.

In one embodiment, a cooling zone is located downstream of the aerosol transport reactor. The cooling zone is preferably expanded and of a larger diameter than the inner "reaction" shell. The cooling zone is preferably a jacketed steel tube with a coolant flowing within the jacket of the tube. The function of the cooling zone is to provide a larger volume where product gases and dissociated product particles can be cooled. The purpose of the expanded tube is twofold. First, it provides for a reduced velocity of product gas and entrained particles flowing through it and, hence, an increased residence time for cooling. Second, the expanded design allows for dissociated product particles to be cooled while flowing in the gaseous space, thus, reducing thermophoretic deposition of fine particles on the cooler wall. This design reduces the tendency for dissociated product particles to deposit along the cooling zone wall.

Additionally, a system element for removing the solid dissociation products from the gas stream can be provided. Carbon black particles are preferably removed from the gas stream after the gas exits the reaction chamber. The carbon black may be removed from the gas stream by suitable methods as known in the art, such as by filtration, cyclonic separation, or a combination thereof. Some of the carbon black particles may be recycled in the process, preferably providing absorber surfaces for heating the gas. The carbon black may be sold as a product or may be used as a raw material to supply a carbon conversion fuel cell for generating electricity. The carbon black from the solar-thermal dissociation process is fine sized and preferably substantially free of sulfur and ash. Hence, it is a preferred feed stock for supplying a carbon conversion fuel cell.

The system may also comprise a system element for separating hydrogen from non-dissociated gaseous components or otherwise purifying the hydrogen produced by the process. The product gas that is separated from the heat absorbing particles can be purified using a pressure swing adsorber (PSA), membrane or some other type of gas separation device that will separate hydrogen from non-dissociated gaseous reactants (i.e. CH4, CxHy, natural gas, etc.) or byproducts of reaction (e.g. acetylene, etc). Some of the purified hydrogen can be recycled to the process, preferably as the "fluid-wall" gas and "purge gas". Some of the recycled hydrogen can be fed to an upstream hydrogenator to hydrogenate mercaptans that may have been added to the natural gas. The hydrogenated mercaptans are then removed along with H2S in a molecular sieve such as an adsorption bed of zinc oxide particles. The bulk of the hydrogen will be used in downstream processes, preferably to supply fuel cell batteries for stationary generation of electricity or for on board transportation applications involving fuel cell vehicles. The purified hydrogen exiting the separation device (PSA or membrane) may supply a hydrogen pipeline at lower pressure or may be compressed and stored in a storage tank, such as at a service station for servicing fuel cell vehicles.

Figure 4:
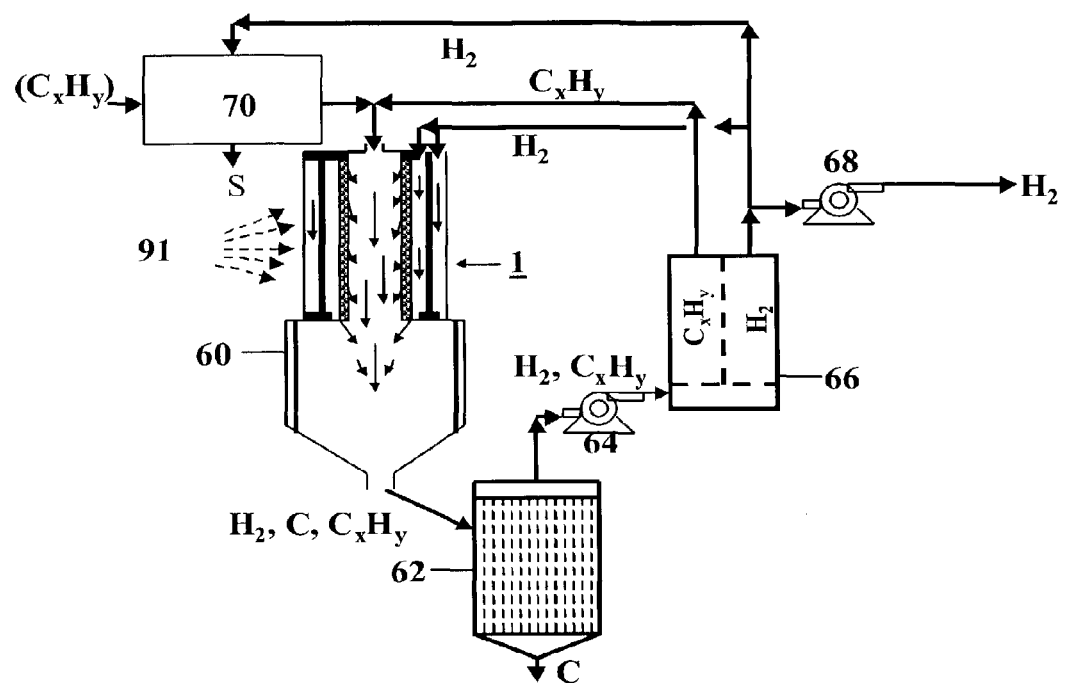
FIG. 4 is a schematic of a solar-thermal natural gas dissociation system employing a solar thermally heated fluid-wall reactor of the disclosure.

FIG. 4 illustrates one system comprising a hydrogenation and ZnO bed (70), solar-thermal fluid wall reactor (1), a cooling zone (60) immediately following the reactor, a baghouse filter (62), a low pressure compressor (64), a pressure swing adsorber (66), and a high pressure compressor (68). The high pressure compressor can additionally be connected to a hydrogen storage device, not shown in FIG. 4.

In another embodiment, a reactor with a transparent outer shell such as a quartz tube may be coupled to one or more thermophotovoltaic devices. Thermal radiation from the outermost inner shell of the reactor (e.g. from a graphite heating tube in a three shell reactor) which passes out through the transparent outer shell can be used to power the thermophotovoltaic devices. The thermophotovoltaic devices are placed in locations not shielded by the solar concentrator.

Those of ordinary skill in the art will appreciate that starting materials, reactor components, reactor system components, and procedures other than those specifically exemplified can be employed in the practice of this disclosure without resort to undue experimentation. The skilled artisan will be further aware of materials, methods and procedures which are functional equivalents of the materials, methods and procedures specifically exemplified herein. All such art-known functional equivalents are intended to be encompassed by this disclosure.

All references cited herein are incorporated by reference herein to the extent that they are not inconsistent with the teachings herein.

EXAMPLES

Example 1

Operation of a Three-Shell Reactor

In accordance with the present disclosure, a concentric three-tube aerosol transport reactor was constructed and vertically interfaced to the HFSF at NREL. The aerosol transport reactor consisted of an outer 5.1 cm outside diameter times 4 mm thick times 24 cm long quartz "protection" tube, a central 2.4 cm outside diameter times 4 mm thick times 35.6 cm long graphite "heating" tube, and a 1.8 cm outside diameter times 6 mm thick times 44 cm long graphite "reaction" tube. The "reaction" tube consisted of a 30 cm long porous graphite section with 7 cm of solid graphite tube on both ends of the "reaction" tube. The porosity of the graphite tube was 49% with a permeability of air (at standard temperature and pressure (STP)) of 1 ft3/ft2/min. It was a sunny day. A secondary concentrator delivered 7.4 kW of solar-thermal power over a 9.4 cm length. The concentrator was positioned concentrically around the outer quartz "protection" tube. A 99% methane/1% argon gas was fed at a rate of 4 standard liters per minute (slpm) into the top of the graphite "reaction" tube and flowed downward. Hydrogen "fluid-wall" gas was fed at a rate of 1 slpm to the annular region between the inner "reaction" tube and the central "heating" tube. The hydrogen flowed within the annular region and through the porous section of the "reaction" tube and exited radially inward providing a fluid-wall of hydrogen along the inside "reaction" tube wall. Argon "purge" gas flowed at a rate of 2 slpm in the annular region between the outer quartz "protection" tube and the central solid graphite "heating" tube. The argon prevented oxidation of the graphite "heating" tube. No carbon black absorber particles were fed to the inner "reaction" tube. The temperature of the reactor as measured by a Type B thermocouple inserted in the hot zone was 1873 K. Feed gas was flowed for approximately 1 hour. A downstream gas chromatograph analyzed the steady state composition of the exiting stream, after the 1 slpm "fluid-wall" hydrogen was subtracted out. A downstream flowmeter measured the gas flow rate as 3.2 slpm (after subtracting out the 1 slpm fluid-wall H2). The unreacted methane content was 30 mole % with the remaining gas essentially hydrogen. This corresponded to a conversion of 76% of the feed methane for a residence time of approximately 0.03 seconds. The system was taken off sun and allowed to cool. No dissociated carbon was found to be deposited anywhere along the inside wall of the "reaction" tube. The product carbon black collected downstream was analyzed by x-ray diffraction and found to be essentially amorphous carbon black with a primary particle size between approximately 20 and 40 nanometers. This example illustrates that the fluid-wall reactor tube prevented deposition of reaction products within the reactor and allowed continuous operation.

Example 2

Operation of a Three-Shell Reactor with No "Fluid-Wall" Gas Flow

The process conditions of Example 1 were repeated except that no "fluid-wall" hydrogen gas was flowed through the porous "reaction" tube. Within 8 minutes, the process was shut down due to difficulties maintaining feed gas flow using mass flow controllers. After cooling, the reactor was dismantled and inspected. It was found that carbon was deposited inside of the "reaction" tube. The carbon was analyzed by x-ray diffraction and found to contain a large graphitic content. This comparative example illustrates that, without the fluid-wall, the reactor plugs and prevents continuous operation.

Example 3

Reactor Operation with Increased Fluid-Wall and Purge Gas Flow Rates

The apparatus described in Example 1 was used except that the "fluid-wall" gas was changed to argon. It was fed at a rate of 4 slpm through the porous tube wall. In addition, the argon "purge" gas flow was increased to 10 slpm.

Examples 4 to 12

Reactor Operation with Varying Methane Flow Rate and Solar Flux

The apparatus described in Example 1 was used with the gas flow rates given in Example 3. The nonporous "heating" wall temperature was measured through a hole in the trough section of the secondary concentrator using a pyrometer. For this apparatus, the temperature of the wall of the nonporous carbon tube was typically about 100-200 K higher than the temperature inside the reaction tube. The solar flux was varied in order to achieve heating wall temperatures of 1716, 1773, 1923, 2073, and 2140 K. Although the "fluid-wall" argon flow rate was maintained at 4 slpm, the methane flow rate was varied from 0.8 to 2.2 slpm. All flow rates corresponded to average residence times between approximately 10 and 20 milliseconds. The dissociation (conversion) of methane to hydrogen and carbon black was calculated from the measured concentration of H2 and is reported in Table 1.

TABLE 1

(Examples 4 to 12) Methane Dissociation

| Heating Wall Temperature (K.) | Initial Methane Flow Rate (slpm) | Conversion of Methane (%) |
|---|---|---|
| 1716 | 0.8 | 0 +− 5 |
| 1716 | 2.2 | 0 +− 5 |
| 1773 | 1 | 15 +− 5 |
| 1773 | 2 | 18 +− 5 |
| 1923 | 1.5 | 29 +− 5 |
| 2073 | 1 | 69 +− 5 |
| 2073 | 2 | 55 +− 5 |
| 2140 | 0.8 | 81 +− 5 |
| 2140 | 2.2 | 83 +− 5 |

This set of examples indicates that increasing the solar flux, which in turn increases the heating wall temperature and the temperature inside the reactor tube, results in an increase in the thermal dissociation (conversion) of methane to H2 and carbon black. The product carbon black for all runs was analyzed by x-ray diffraction and transmission electron microscope images to determine that it was amorphous carbon black with a primary particle size of 20 to 40 nanometers.

Examples 13 to 24

Dry Reforming with Varying Total Feed Rate and Solar Flux

The apparatus described in Example 1 was used. During these experiments, the argon "purge gas" was fed at a rate of 10 slpm. The "fluid-wall" argon was fed at a rate of 4 slpm. The reactant gas was maintained at a two to one CH4 to CO2 feed ratio. Total flow rates of 1 and 2 slpm were used. By changing the solar flux, the heating wall temperature was varied from 1873 to 2123 K, with increments of 50 K. The conversion of methane was calculated from the measured concentration of H2, and the conversion of CO2 was calculated from the measured concentration of CO. Both values are reported in Table 2.

TABLE 2

Examples 13 to 24 (Dry Reforming and Dissociation)

| Heating Wall Temperature (K.) | Total Flow Rate of CH4 and CO2 (slpm) | CH4 Conversion (%) | CO2 Conversion (%) |
|---|---|---|---|
| 1873 | 1 | 35 +− 14 | 17 +− 11 |
| 1925 | 1 | 47 +− 1 | 22 +− 2 |
| 1977 | 1 | 58 +− 1 | 35 +− 5 |
| 2025 | 1 | 65 +− 7 | 51 +− 18 |
| 2074 | 1 | 71 +− 6 | 65 +− 7 |
| 2108 | 1 | 69 +− 5 | 56 +− 16 |
| 1924 | 2 | 29 +− 5 | 19 +− 9 |
| 1924 | 2 | 20 +− 4 | 6 +− 3 |
| 1974 | 2 | 27 +− 2 | 8 +− 3 |
| 2022 | 2 | 39 +− 3 | 15 +− 3 |
| 1801 | 2 | 51 +− 7 | 30 +− 13 |
| 1831 | 2 | 55 +− 9 | 35 +− 16 |

The average residence time of all runs was approximately 10 milliseconds. This set of examples indicates that concentrated sunlight can be used to carry out dry CO2 reforming of CH4 reactions in short residence times. It is also evident that both increased temperature and decreased reactant gas flow rate result in higher conversion of CO2 to CO and CH4 to H2.

Examples 25 to 30

Reactor Operation During Dry Reforming with Varying Total Feed Rate and Methane to Carbon Dioxide Feed Ratio The apparatus described in Example 1 was used with the flow rates presented in Example 3. For a given day, the highest available solar flux level was utilized. This resulted in heating wall temperatures ranging from 2063 to 2115 K, as seen in Table 3. Total CH4 and CO2 feed rates of 1 and 2 slpm were used. Three CH4 to CO2 feed ratios were utilized: 1 to 1, 1.5 to 1, and 2 to 1. The conversion of methane was calculated from the measured H2 concentration, and the CO2 conversion was calculated from the measured CO concentration. Both values for each experiment appear in Table 3.

TABLE 3

Examples 25 to 30 (Simultaneous Dry Reforming and Dissociation)

| Total Flow Rate of CH4 and CO2 (slpm) | CH4 to CO2 Feed Ratio (molar volume) | Heating Wall version Temperature (K) | CH4 Conversion (%) | CO2 Conversion (%) |
|---|---|---|---|---|
| 1 | 1:1 | 2063 | 64 +− 7 | 33 +− 7 |
| 1 | 1.5:1 | 2114 | 76 +− 2 | 64 +− 8 |
| 1 | 2:1 | 2108 | 69 +− 5 | 56 +− 16 |
| 2 | 1:1 | 2083 | 50 +− 2 | 20 +− 2 |
| 2 | 1.5:1 | 2115 | 58 +− 3 | 34 +− 6 |
| 2 | 2:1 | 2104 | 55 +− 9 | 35 +− 16 |

This set of experiments shows that the fluid-wall aerosol flow reactor can be used to carry out dry CO2 reforming of CH4 reactions with various reactant feed ratios. It also indicates that for a given total flow rate, changing the feed ratio does not significantly change the conversion of CH4 to H2 or the conversion of CO2 to CO. However, both conversion values are increased when the total flow rate of CH4 and CO2 is decreased from 2 slpm to 1 slpm.

Additional points include

The present disclosure provides a method for carrying out high temperature thermal dissociation reactions requiring rapid-heating and short residence times using solar energy. In particular, the present disclosure provides a method for carrying out high temperature thermal reactions such as dissociation of hydrocarbon containing gases and hydrogen sulfide to produce hydrogen and dry reforming of hydrocarbon containing gases with carbon dioxide. In the methods of the disclosure where hydrocarbon containing gases are dissociated, fine carbon black particles are also produced. The methods of the disclosure reduce or prevent the produced carbon black from depositing along the inside wall of the reactor or cooling zone. The present disclosure also provides solar-thermal aerosol transport reactors and solar-thermal reactor systems. The present disclosure also provides systems and methods for separating the produced carbon black from the product gases, purifying the hydrogen produced by the dissociation reaction, and using the carbon black and hydrogen to generate electricity.

There is an enormous environmental benefit for carrying out high temperature dissociation reactions directly without the combustion of carbonaceous fuels. Thus, the present disclosure provides a continuous cost-effective, solar-based method of deriving hydrogen and fine carbon black particles from hydrocarbon gases. The process does not result in increased environmental damage due to burning fossil fuels.

The process of the present disclosure uses concentrated sunlight to transfer heat at extremely high rates by radiation heat transfer to inert radiation absorbing particles flowing in dilute phase in the process gas. The heating to the particles is generally carried out indirectly from a heated wall or series of walls which are themselves heated indirectly or heated directly by solar-thermal radiative heating. The inside most wall ("reaction") is at least partially fabricated of a porous refractory material with a compatible "fluid-wall" gas flowing inward, thus, providing a blanket of gas and preventing deposition of particles on the inside wall. The particles subsequently become radiators themselves and heat flowing gases by conduction, thereby providing the energy to carry out highly endothermic gas phase dissociation reactions. The radiative coupling to heat flowing radiation absorbing particles is beneficial because the gases to be heated are themselves transparent to radiative heating. Preferably, the gases and the particles flow co-currently to maximize the temperature and heating rate of the gases. It is possible for the absorber particles to either be fed into the process with the reactant gas or to be generated in-situ by the reaction itself.

In an embodiment, a method for carrying out a high temperature chemical reaction process to produce hydrogen or synthesis gas may include at least the following the steps: a) providing a reactor comprising at least two reactor shells, including an innermost and an outer shell, wherein the innermost shell is substantially enclosed by each of the other reactor shells, has an inlet and an outlet and is at least partially porous and the outer shell is nonporous and at least partially transparent; b) flowing a first gas stream comprising at least one reactant gas from the inlet to the outlet of the innermost shell; c) flowing a second gas stream comprising a non-dissociating gas inwardly through the pores of the innermost shell; d) providing heat absorbing particles in the first gas stream; e) heating the heat absorbing particles at least in part with a source of concentrated sunlight through indirect solar thermal heating; and f) transferring heat from the particles to the first gas stream, thereby heating the reactant gas to a sufficiently high temperature so that a desired amount of conversion of the reactant gas occurs, thereby producing hydrogen or synthesis gas.

The reactant gas may be a gaseous hydrocarbon, hydrogen sulfide or a mixture thereof. For example, the gaseous hydrocarbon is methane, ethane, propane, butane, or a mixture thereof. Alternatively, the reactant gas maybe at least one gaseous carbon oxide including carbon dioxide, carbon monoxide, or mixtures thereof. The volume concentration of carbon dioxide in the reactant gas can be less than 50 volume percent. The heat absorbing particles can be carbon particles, and the carbon particles are fed into the innermost shell with the first gas stream. The temperature of the reactor is at least about 1500 K. The source of concentrated sunlight can have a flux of between 1500 and 5000 kW/m2.

Although the foregoing embodiments have been described in some detail for purposes of clarity of understanding, the invention is not limited to the details provided. There are many alternative ways of implementing the invention. The disclosed embodiments are illustrative and not restrictive.

We claim:

1. A high temperature chemical reactor configured to conduct a reaction process that produces hydrogen or synthesis gas, comprising:
   a reactor having at least two reactor shells, including an inner shell and an outer shell, wherein the inner shell has an inlet and an outlet and the outer shell is nonporous and substantially encloses the second inner shell, a particle inlet configured to provide heat absorbing particles in a first gas stream flowing in the inner shell; wherein the reactor is heated at least in part by a source of concentrated sunlight, where the inner shell is heated by the concentrated sunlight, and the inner shell re-radiates from the inner wall and heats the heat absorbing particles in the first gas stream flowing through the inner shell, and heat transfers from the heat absorbing particles to the first gas stream, thereby heating the reactants in the first gas stream to a sufficiently high temperature so that the first gas stream undergoes the desired reaction(s), thereby producing hydrogen or synthesis gas in the first gas stream, a cooling zone located downstream of the inner shell the reactor, where the cooling zone is expanded and of a larger diameter than inner shell and the cooling zone provides a larger volume where product gases and dissociated product particles can be cooled; and a system element for removing the solid dissociation products from the first g as stream after the first gas stream exits the inner shell, where the solid dissociation products are removed from the first gas stream by 1) filtration, 2) cyclonic separation, or 3) a combination thereof; and a low pressure compressor connected downstream of the inner shell of the reactor.

2. The high temperature chemical reactor of claim 1, further comprising:
a solar concentrator designed to optimize an amount of solar thermal heating for the reaction process by providing the concentrated sunlight to transfer heat at extremely high rates by radiation heat transfer from the inner shell to the heat absorbing particles flowing in the first gas stream, and where the heat to the particles comes indirectly from a heated wall or series of walls which are themselves heated directly or indirectly by solar-thermal radiative heating, and the particles subsequently become radiators themselves and heat flowing gases by conduction, thereby providing energy to carry out the endothermic reactions producing the hydrogen or synthesis gas.

3. The high temperature chemical reactor of claim 1, further comprising:
a solar concentrator designed to optimize an amount of solar thermal heating for the reaction process by using concentrated sunlight to transfer heat at extremely high rates by radiation heat transfer from the inner shell, where the length of the inner shell and amount of flux provided by the solar concentrator are designed to carry out high temperature thermal dissociation reactions requiring rapid-heating and short residence times using solar energy, where the residence time is between about 1 and about 50 milliseconds, and the solar fluxes are between about 1500 and 5000 kW/m2.

4. The high temperature chemical reactor of claim 1, where the concentrated solar-thermal radiation passes through the outer shell and directly heats a second inner heating shell, where the heating shell re-radiates from its inner wall and heats the inner shell where the reaction takes place within, and thus, the inner shell is heated indirectly by concentrated sunlight from the surrounding second inner heating shell.

5. The high temperature chemical reactor of claim 1, where the concentrated solar-thermal radiation passes through the outer shell and directly heats inner shell where the reaction takes place within and the inner shell re-radiates from an inner wall to heat the heat absorbing particles and the first gas stream flowing through the inner shell.

6. The high temperature chemical reactor of claim 1, further comprising:
a high pressure compressor connected downstream of the inner shell of the reactor which supplies the product hydrogen based gases to a storage device; and
a Zinc oxide bed to further purify the product hydrogen based gases coming out of the reactor.

7. The high temperature chemical reactor of claim 1, further comprising:
where the at least two reactor shells are vertically orientated and arranged to provide downward flow of the first gas stream with the heat absorbing particles, which reduces a potential for plugging in a particles feed line, and
an interior of the inner shell defines a reaction chamber within which the high temperature reaction takes place, where the inner shell is designed to be capable of emitting sufficient radiant energy to raise the temperature of the reactant gas(es) within the reaction chamber to a level required to initiate and sustain the desired chemical reaction, and the inner shell is made of a high temperature refractory material, and where the refractory material subsequently heats flowing heat absorbing particles flowing through the first inner shell and is substantially chemically unreactive with 1) the particles, 2) the reactant gases, or the 3) product gases and 4) any combination.

8. The high temperature chemical reactor of claim 7, where the high temperature refractory material for the inner shell is graphite.

9. The high temperature chemical reactor of claim 1, wherein the reactor is heated at least in part by the concentrated sunlight, and a second inner shell is made of graphite, and configured to have an electrical current run from one end of the tube to the other to generate additional heat for the process through resistance heating of the tube.

10. The high temperature chemical reactor of claim 1, wherein the outer shell is at least in part transparent or semi-transparent to pass the concentrated sunlight to flow through and heat the inner shell of the reactor, and the outer shell is made of a high temperature material that is oxidation resistant, and the shell wall transparent area, which allows for concentrated sunlight entry and subsequent solar thermal heating, is designed and selected to provide heating to meet a desired reaction residence time requirements for the process between about 1 and about 50 milliseconds.

11. The high temperature chemical reactor of claim 1, further comprising:
where the first gas stream comprises at least one reactant selected from $CH_4$, $C_2H_6$, $C_3H_8$, $C_xH_y$ where X and Y are whole numbers, $H_2S$, natural gas, or any combination thereof, and the first gas stream contains substantial amounts of carbon based biogases.

12. The high temperature chemical reactor of claim 1, further comprising:
where the heat-absorbing particles are carbon based, and are indirectly heated by radiation from a heated wall of the inner shell, that is itself heated indirectly or directly by solar-radiation, and the radiation absorbing particles have a fine primary particle size, preferably in the sub-micron size range, and are nonaggiomerated, to provide a high surface area possible for radiation absorption.

13. A high temperature chemical reactor configured to conduct a reaction process that produces hydrogen or synthesis gas, comprising:
a reactor having at least two reactor shells, including an inner shell and an outer shell, wherein the inner shell has an inlet and an outlet and the outer shell is nonporous and substantially encloses the second inner shell, and a particle inlet configured to provide heat absorbing particles in a first gas stream flowing in the inner shell; wherein the reactor is heated at least in part by a source of concentrated sunlight, where the inner shell is heated by the concentrated sunlight, and the inner shell re-radiates from the inner wall and heats the heat absorbing particles in the first gas stream flowing through the inner shell, and heat transfers from the heat absorbing particles to the first gas stream, thereby heating the reactants in the first gas stream to a sufficiently high temperature so that the first gas stream undergoes the desired reaction (s), thereby producing hydrogen or synthesis gas in the first gas stream, wherein the reactor is heated at least in part by the concentrated sunlight, and a second inner shell is made of graphite, and configured to have an electrical current run from one end of the tube to the other to generate additional heat for the process through resistance heating of the tube.

14. The high temperature chemical reactor of claim 13, further comprising:

a solar concentrator designed to optimize an amount of solar thermal heating fur the reaction process by providing the concentrated sunlight to transfer heat at extremely high rates by radiation heat transfer from the inner shell to the heat absorbing particles flowing in the first gas stream, and where the heat to the particles comes indirectly from a heated wall or series of walls Which are themselves heated directly or indirectly by solar-thermal radiative heating, and the particles subsequently become radiators themselves and heat flowing gases by conduction, thereby providing energy to carry out the endothermic reactions producing the hydrogen or synthesis gas.

15. The high temperature chemical reactor of claim 13, further comprising:

a solar concentrator designed to optimize an amount of solar thermal heating for the reaction process by using concentrated sunlight to transfer heat at extremely high rates by radiation heat transfer from the inner shell, where the length of the inner shell and amount of flux provided by the solar concentrator are designed to carry out high temperature thermal dissociation reactions requiring rapid-heating and short residence times using solar energy, where the residence time is between about 1 and about 50 milliseconds, and the solar fluxes are between about 1500 and 5000 kW/m2.

16. The high temperature chemical reactor of claim 13, where the concentrated solar-thermal radiation passes through the outer shell and directly heats a second inner heating shell, where the heating shell re-radiates from its inner wall and heats the inner shell where the reaction takes place within, and thus, the inner shell is heated indirectly by concentrated sunlight from the surrounding second inner heating shell.

17. The high temperature chemical reactor of claim 13, where the concentrated solar-thermal radiation passes through the outer shell and directly heats inner shell where the reaction takes place within and the inner shell re-radiates from an inner wall to heat the heat absorbing particles and the first gas stream flowing through the inner shell.

18. The high temperature chemical reactor of claim 13, further comprising:

a cooling zone located downstream of the inner shell of the reactor, where the cooling zone is expanded and of a larger diameter than the inner shell and the cooling zone provides a larger volume where product gases and dissociated product particles can be cooled;

a system element for removing the solid dissociation products from the first gas stream after the first gas stream exits the inner shell, where the solid dissociation products are removed from the first gas stream by 1) filtration, 2) cyclonic separation, or 3) a combination thereof; and a low pressure compressor connected downstream of the inner shell of the reactor.

19. The high temperature chemical reactor of claim 13, further comprising:

a high pressure compressor connected downstream of the inner shell of the reactor which supplies the product hydrogen based gases to a storage device; and a Zinc oxide bed to further purify the product hydrogen based gases coming out of the reactor.

20. The high temperature chemical reactor of claim 13, where the first gas stream comprises at least one reactant selected from CH4, C2H6, C3H8, CxHy where X and Y are whole numbers, H2S, natural gas, or any combination thereof, and the first gas stream contains substantial amounts of carbon based biogases.

* * * * *